United States Patent [19]
Kuchta et al.

[11] Patent Number: 4,953,469
[45] Date of Patent: Sep. 4, 1990

[54] SELECTIVELY POSITIONABLE VARIABLE HEIGHT WORKSTATION AND METHOD OF USE

[75] Inventors: Richard Kuchta, Tolland; Larry Billings, Manchester; Vladimir Evenzon, Vernon; Donald Bristow, Ellington, all of Conn.

[73] Assignee: Gerber Garment Technology, Inc., Tolland, Conn.

[21] Appl. No.: 407,862

[22] Filed: Sep. 15, 1989

[51] Int. Cl.$^5$ ............................................. B61B 5/00
[52] U.S. Cl. .................................. 104/127; 104/29; 104/88; 104/137; 104/252
[58] Field of Search ............... 104/96, 123, 128, 129, 104/130, 249, 137, 29, 132, 252, 88, 125; 187/8.41, 8.61, 9 E, 17; 414/222; 198/465.4, 346.1

[56] References Cited

U.S. PATENT DOCUMENTS

| | | | |
|---|---|---|---|
| 2,511,316 | 6/1950 | Cody | 104/44 |
| 3,055,311 | 9/1962 | Sgriccia et al. | 104/93 |
| 3,140,669 | 7/1964 | Parker | 104/88 |
| 4,019,605 | 4/1977 | Kropf | 104/127 |
| 4,706,782 | 11/1987 | Spoeler et al. | 104/127 |

FOREIGN PATENT DOCUMENTS

581227 1/1962 Italy .
195371 4/1967 U.S.S.R. .

*Primary Examiner*—Robert P. Olszewski
*Assistant Examiner*—Mark T. Le
*Attorney, Agent, or Firm*—McCormick, Paulding & Huber

[57] ABSTRACT

A variable height workstation includes a trolley delivery apparatus for controllably moving a rail section from a gap formed in a subsidiary loop rail to a workstation located remotely from the loop. A pivotal cam is controllably rotated by an actuator and moves with the rail section and arrests travel of a trolley on the moveable rail section so that rail section may be removed toward the workstation while carrying the trolley. The pivotal cam is also capable of accelerating a trolley off the rail section either after the rail returns to its normal bridging position or from the rail section without it being lowered. The trolley delivery apparatus is employed in a subsidiary loop system whereby a preworkstation indexer is located upstream of it to advance individual diverted trolleys onto the moveable rail section. A control system utilizing an algorithm is employed which synchronizes the movement of the indexers and the rail section so that an operator may selectively control the movements of the trolley delivery apparatus.

29 Claims, 10 Drawing Sheets

SELECTIVELY POSITIONABLE VARIABLE HEIGHT WORKSTATION AND METHOD OF USE

The present application relates to U.S. Pat. Application No. 400,290 filed on Aug. 29, 1989, now U.S. Pat. No. 4,922,829, entitled VARIABLE HEIGHT WORKSTATION AND SYSTEM which application being commonly assigned with the assignee of the present invention.

BACKGROUND OF THE INVENTION

The present invention resides in a conveyorized transport apparatus having a rail system for transporting articles carried by a trolley between one location and another and, more particularly relates to a trolley delivery apparatus capable of controllably delivering a trolley from a first location on a subsidiary loop rail to a second diverted location adjacent a workstation.

A conveyorized transport system used for transporting workpieces between a series of subsidiary loops located adjacent individual workstations is disclosed in U.S. Pat. No. 4,615,273 issued on Oct. 7, 1986 and commonly assigned with the assignee of the present invention. Systems of this type usually involve a series of workers situated at workstations on either side or on both sides of the main rail. Individual ones of the trolleys are scanned and then, according to a predetermined program employed by a master computer or controller, diverted toWard a selected one of the workstations located along the main rail. Each operator or worker associated with a particular workstation is charged with a given function to perform on the workpiece carried by the diverted trolley when it arrives at the associated workstation. These workers may repeat the same work function several hundred times over the course of a workday in performance of that work function. The trolleys traveling on the main rail are diverted from the main rail system onto subsidiary loops and are usually stopped on these subsidiary loops by gates where Work material carried by respective ones of the trolleys await performance of a work function by an operator situated at the workstation.

The problem associated with these gates is that often they are situated along the subsidiary loop rail such that a stopped trolley and the workpiece carried by it are suspended on a portion of the subsidiary loop at a considerable distance above and away from the operator. Consequently, the operator usually must reach across this distance from a position adjacent his or her workstation to attempt to grasp the workpiece carried by the trolley which has stopped at the gate. Such extended grasping movements tend to exhaust the operator during the course of the workday thus robbing him or her of valuable time and energy which otherwise could be applied toWard the work function at hand. Thus, a clear need for an economically efficient workstation is apparent in order to situate workpieces adjacent a perspective worker so as to minimize the total number of movements required of the worker or operator in performance of a particular work function and thereby maximize efficiency of productivity.

Other devices have been developed which address this problem. One such type of device is disclosed in the U.S. Pat. No. 4,840,123 issued on June 20, 1989. In this patent, the rail of a subsidiary loop is positioned adjacent a workstation with a portion of this rail being capable of pivotal movement through two orthogonally oriented planes so as to position a trolley, carried at the free swinging end of the rail segment, adjacent a workstation. While such a device has been successful in increasing the ergonomic capability of the worker at a given workstation, it is however sometimes desirable to deliver a trolley carrying a workpiece to a workstation without having to sWing a rail segment through any angular movement. Also, it has been found that significant mechanical means are needed to effect pivotal movement of the arm in this patent, requiring both a complex control system and a variety of multifaceted moving parts.

Also, in the aforesaid co-pending U.S. Application No. 400,290, entitled VARIABLE HEIGHT WORKSTATION AND SYSTEM, a trolley delivery apparatus is disclosed which automatically delivers a trolley from a subsidiary loop rail to a workstation. While such trolley delivery apparatus have been found to greatly enhance the ergonomic capabilities of the worker at his or her workstation, such apparatus have sometimes however been problematic in that they do not allow the operator the option of either lowering the involved trolley to the workstation or, instead to allow the trolley to pass through the workstation without being lowered.

Accordingly, it is an object of the present invention to provide variable height workstation capable of controllably diverting a trolley from a subsidiary loop to a workstation or, instead of such diverting action, allowing the involved trolley to travel along the subsidiary loop without being so diverted.

It is yet another object of the present invention to provide a workstation capable of efficiently managing the travel of trolleys through subsidiary loop and back onto the main rail from which main rail the trolleys were originally diverted.

Still a further object of the present invention is to provide a conveyorized transport apparatus capable of routing trolleys to an operator performing a work function at a workstation on a workpiece carried by a diverted trolley traveling on the subsidiary loop rail such that the operator accomplishes this task with maximum ergonomic ease.

SUMMARY OF THE INVENTION

The present invention resides in a variable height workstation used in a subsidiary loop of a conveyorized transport system employing a trolley delivery apparatus having a moveable rail section located within a gap formed in the subsidiary loop rail and being moveable between an upper position where the moveable rail section bridges the gap in the subsidiary loop and a lower diverted position adjacent a workstation. Trolley engagement means move vertically with the moveable rail section and are employed for controllably arresting the travel of a trolley on the moveable rail and for controllably accelerating a trolley off the rail section. The moveable rail section and the engagement means are fixedly secured with one another and to a vertical actuator for unitary movement betWeen the upper and lower positions. Control means are provided for controlling the vertical movement of the rail section according to instructions inputted into it by the operator.

The invention also resides in a method of operating the selectively positionable variable height workstation in which method sensors are interrogated to establish the presence of a trolley at predetermined locations as well as establishing whether the rail section is in its bridging position, and depending upon the results of such interrogations, automatically executing commands to carry out an operation which is selected by the operator associated with the workstation.

DETAILED DESCRIPTION OF THE PREFERRED EMBODIMENT

Figure 1:
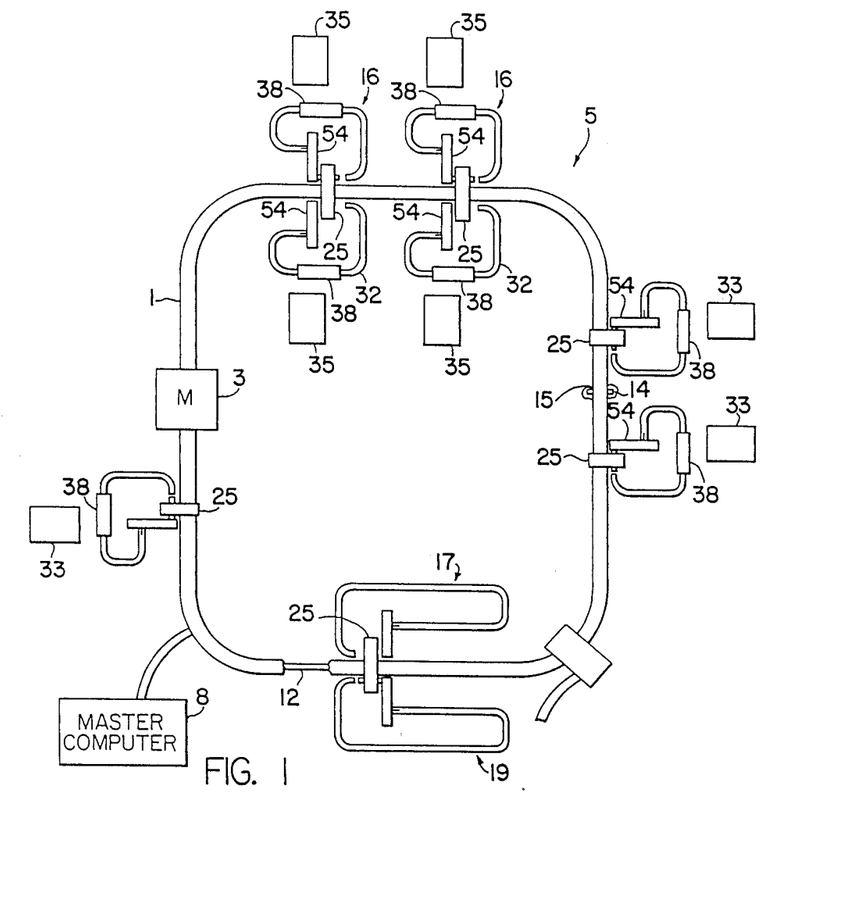
Fig. 1 is a top view of an automated transport system capable of employing the variable height workstation embodying the present invention.

Turning first to FIG. 1, an automated transport system shown generally as 5 employs the invention. The system includes a propulsion track 1 in the form of an extruded channel through which an endless chain having pushers 15,15 travels under power from a motorized drive unit 3. Situated beneath the track 1 is a main rail 12 along which freely traveling trolleys 14,14 ride while being propelled by the pushers 15,15. Positioned along the track along either or along both sides, such as in pairs, are subsidiary loops, 6,16 and 32,32 leading to and from a workstation table 3,35 and are subsidiary loops 17 and 19 leading to storage facilities from the track 1. The automated transport system 5 further includes a master computer 8 for controlling the movements of three position switches 25,25 which route the trolleys between the main rail 12 and each pair of subsidiary loops 32,32 and 16,16 or directly between adjacently disposed subsidiary loop pairs 32,16 and 32,16. The subsidiary loops 32 and 16 either individually or in pairs, and the associated one of the workstation tables 33 and 35 may include selectively positionable variable height workstation embodying the present invention shown schematically as reference numeral 38 in FIG. 1.

Figure 2:
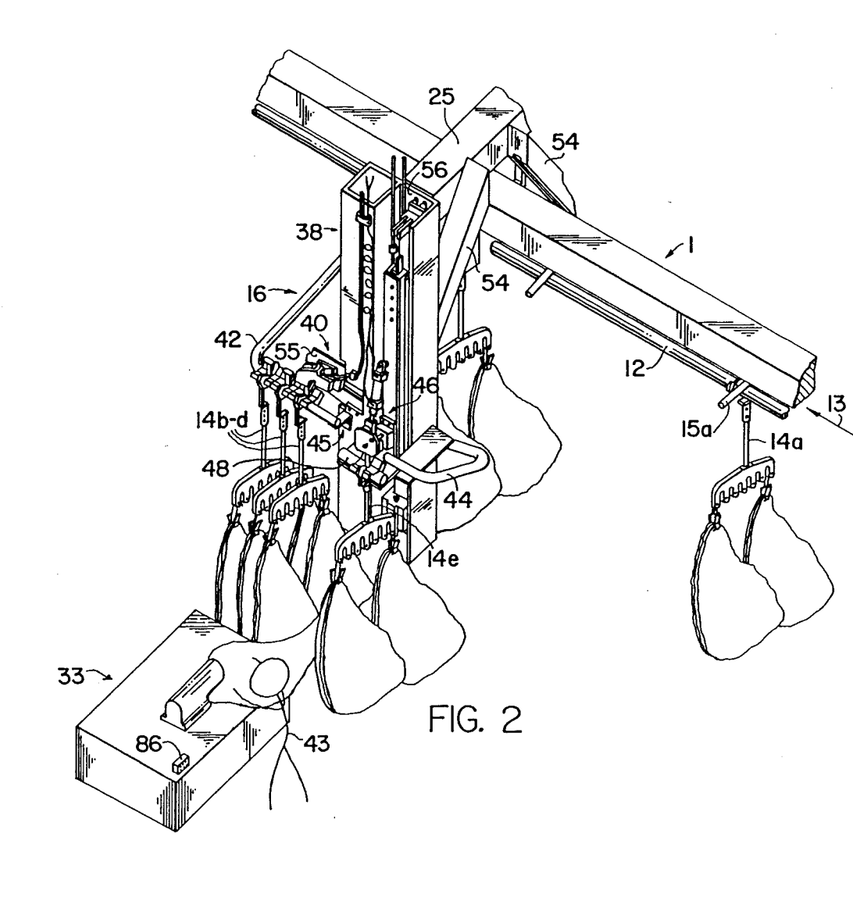
FIG. 2 is a perspective view of a portion of the subsidiary loop of the automated transport system of FIG. 1 illustrating the selectively positionable variable height workstation embodying the present invention.

Referring now to FIG. 2, a section of the automated transport system 5 of FIG. 1 is shown and illustrates the selectively positionable variable height workstation 38 situated generally midway along the subsidiary loop 16 with the rail defining the loop 16 being formed from pipe bent or cast to curve into a position adjacent the workstation table 33. As shown, a trolley 14a rides on the main rail 12 and is propelled in the illustrated direction 13 by one of the pushers 15 specifically identified as 15a. A series of restricting brackets (not shown) extend downwardly from and are driven by the endless chain traveling along the track 1 and are positioned in front of each of the pushers 15,15 such that the trolley 14a as shown in FIG. 2 is moved toward the subsidiary loop 16 under the positive force of the pusher 15a. When instructed by the master computer 8 to do so, the switch 25 diverts a selected one of the trolleys 14 being moved along the main rail 12 into one of the subsidiary loops 16 or 32. The pipe forming each of the loops 16 and 32 also slopes downwardly from its entrance free end adjacent the switch 25 so that a trolley rolls along it under gravity toward the selectively positionable variable height workstation 38. For a more complete description of the transferring operation, reference may be had to the above mentioned U.S. Pat. No. 4,615,273 entitled CONVEYORIZED TRANSPORT SYSTEM.

The selectively positionable variable height workstation 38 embodying the present invention is interposed along the loop 16 such as to separate it into an upstream portion 42 and a downstream portion 44. The two portions 42 and 44 of the loop 16 further define a gap 45 adjacent the selectively positionable variable height workstation 38. A moveable rail section 48 is interposed in the gap 45 and is vertically moveable between an upper position where the rail section 48 bridges the gap 45 and a lower position where it is positioned adjacent the workstation table 33. The selectively positionable variable height workstation 38 further includes a preworkstation indexer or escapement device 40 positioned upstream of the rail section 48 such that trolleys, shown for example as 14b through 14d, may collect at a position upstream of the moveable rail section 48 along the upper portion 42 of the loop 16. The preworkstation escapement device 40 may be one such as disclosed in co-pending U.S. Pat. Application No. 315,152 Entitled ESCAPEMENT MEANS FOR GRAVITY FED TROLLEYS WITH ACCELERATING CAPABILITY filed on Feb. 24, 1989, still pending, being commonly assigned to the assignee of the present invention and which disclosure being hereby incorporated by reference.

As will be described in greater detail later, trolley engagement means 46 are employed with the moveable rail section 48 to cause the travel of the trolley, in the case of FIG. 2 illustrated by reference numeral 14e, to be controllably stopped on or advanced from the rail section 48. In general, the operator 43 controls the movements of the trolley engagement means 46 as well as calling for the vertical movement of the rail section 48 by operating a control box 86 connected to the apparatus which moves the rail section 48 between its upper and lower positions. Usually, the operator lowers the rail section 48 with a trolley on it to a position adjacent the workstation table 33 and performs a work function on the workpiece carried by the trolley and returns the moveable rail section to its upper bridging position so that the engagement means 46 may in turn accelerate the trolley 14e off of the rail section 48 and away from the selectively positionable variable height workstation 38 and onto the downstream rail portion 44 toward an elevator 54. Prior to being received within the elevator 54, the trolleys passing from the selectively positionable variable height workstation 38 may again collect upstream of a second escapement device (not shown) positioned adjacent the lower free end of the loop 16 such that individual ones of the trolleys collect at the second escapement device for subsequent individual advancement onto a transfer slide which in turn moves the involved trolley into an elevator car for movement upwardly towards the main rail 12. For a more complete description of the transfer slide operation, reference may be had to U.S. Ser. No. 249,442 entitled TRANSFER SLIDE ASSEMBLY AND SYSTEM filed on Sept. 26, 1988, now U.S. Pat. No. 4,884,510, which application being commonly assigned to the assignee of the present invention.

Figure 3:
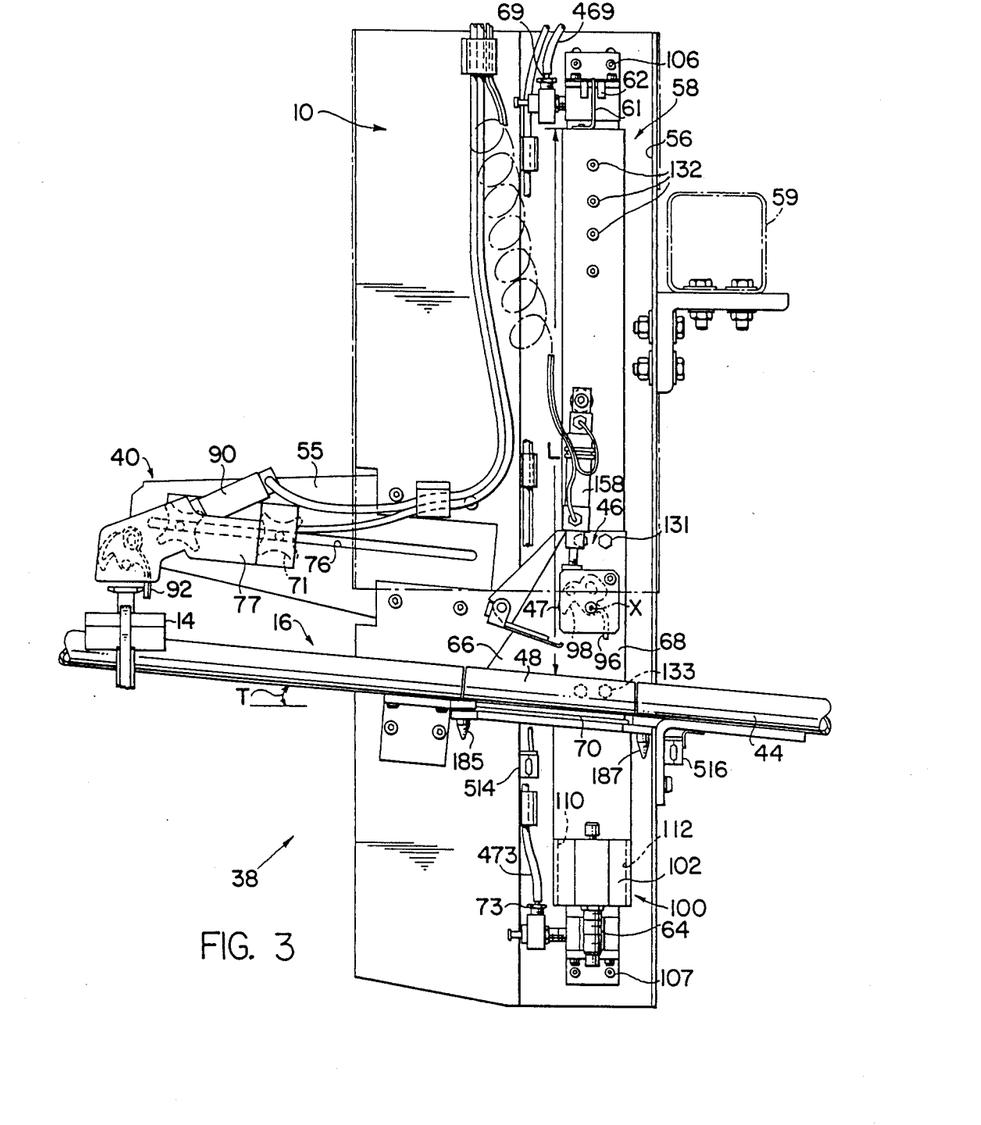
FIG. 3 is a side elevation view of the selectively positionable variable height workstation showing the moveable rail section in its bridging position.
Figure 4:
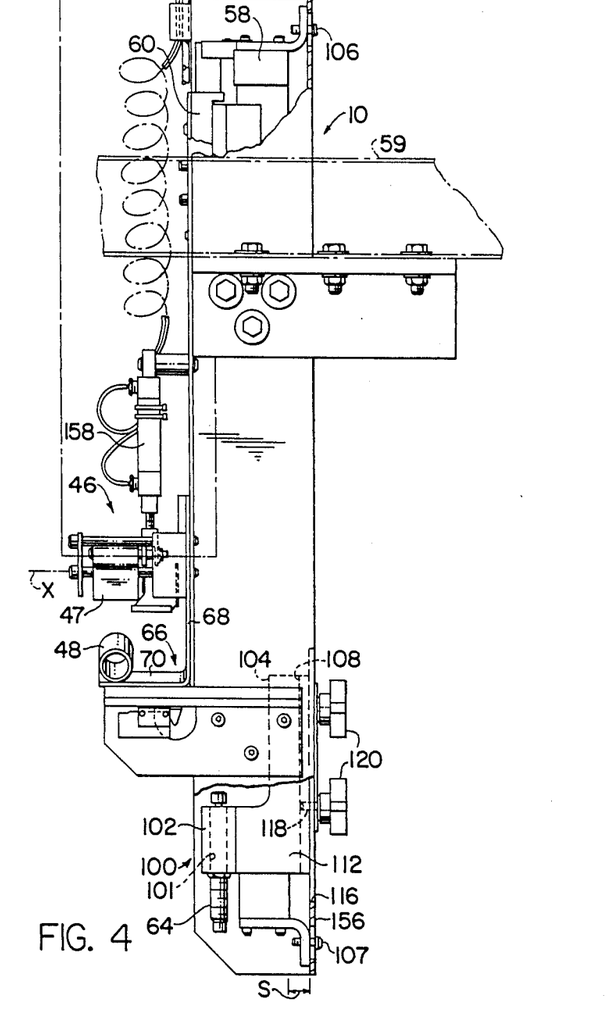
FIG. 4 is a partially fragmented front elevation view taken downstream of the variable height workstation showing the adjustable lower stop structure in fragmented view.

In accordance with the invention, a trolley delivery apparatus shown generally as 10 in FIGS. 3 and 4 includes an elongate vertically disposed actuator 58 supported in an inlaid channel 56 which actuator 58 has a vertically movable slide 60 on which the moveable rail section 48 and the trolley engagement means 46 are fixedly supported. The channel 56 may be vertically supported above the workstation table 33 on crossframe members shown generally as elements 59, but may alternatively be supported from below by a floor support. In the preferred embodiment of the invention, the trolley engagement means 46 includes a pivotal cam or indexer 47 capable of being rotated about axis X by an dual-action actuator 158. The pivotal cam 47 has a stop face 96 and a pusher portion 98 each being angularly moveable with the cam 47 such that the cam 47 may be controllably rotated to an open orientation in which a trolley is accelerated away from the cam 47 or rotated to the trolley blocking orientation shown in FIG. 3 depending upon Which chamber of the dual-action actuator 158 is energized. The moveable slide 60 is capable of travelling on the actuator 58 between an uppermost limit where the top end of the slide 60 carrying a metal strip 61 cooperates with a vertical position sensor 62 and a lowermost limit where a depending end of the slide 60 abuts a lower stop 64. As such, it should be appreciated that the trolley engagement means 46 is fixed for movement with the slide 60 so as to move in unison with the rail section 48 between its upper and lower limits.

A generally L-shaped supporting bracket 66 fixes the moveable rail section 48 and the trolley engagement means 46 to the slide 60. The bracket 66 has a first, generally vertically oriented portion 68 which is secured to the moveable slide 60 at locations 131,133 and includes a second lower portion 70 extending laterally from the first portion 68 such that the rail section 48 is fixedly supported on the second portion 70 of the bracket 66. The second portion 70 of the L-shaped bracket 66 is also inclined at an angle T relative to the vertical portion 68. This inclination enables the rail section 48 to bridge the gap 45 so as to create a continuous surface upon which a trolley may travel from the upstream rail portion 42 and onto the downstream rail portion 44 of the loop 16. It is necessary that the moveable rail section 48 be disposed at the indicated inclination T since both confronting ends of the adjoining upstream and downstream rail portions 42 and 44 of the loop 16 are fixed to the trolley delivery apparatus 10 at the angle T to maintain the downward slope along this region.

One of the features of the present invention is the relative compactness of the delivery apparatus 10 as well as its being smoothly operable in moving the rail section 48 between its upper and lower limits. To this end, the actuator 58 is preferably a dual acting pneumatic actuator of the type known as a BAND CYLINDER having an upper inlet 69 and a lower inlet 73 allowing pressurized fluid, usually compressed air to be introduced into the actuator 58 at selectively different instances. It has been found that by locating the lower stop 64 intermediate the upper and lower distal ends of the actuator housing, the lower end of the actuator housing will be protected from the downward momentum of the internally housed piston sliding in the actuator 58 when the rail section 48 and its associated load are lowered. In addition, the stop 64 is an impact absorbing shock-absorber type element utilizing hydraulic fluid and a coiled spring for gradually arresting the linear motion of the slide 60 as it impacts on the stop 64. It should be appreciated that once the slide 60 is lowered onto the stop 64, the operator may effect performance of the designated work function on the workpiece carried by its trolley by simply grasping laterally outwardly of the adjacently disposed workstation table 33 to access the workpiece.

In order to insure consistent alignment of the rail section 48 with each of the upstream and the downstream rail portions respectively, 42 and 44, of the loop 16, the actuator 58 is fixedly yet adjustably mounted to the channel 56 at points 106 and 107 such that the upper travel limit of the slide 60 is spaced at a distance L above the subsidiary loop 16. The slide 60 being attached to the internally sliding piston of the actuator 58 at securing points 132 becomes vertically spaced at its upper end from the surface of the subsidiary loop 16 by the dimension L when the internally sliding piston in the actuator 58 abuts the internal upper end stop in the actuator housing. Thus, by vertically adjusting the position of the actuator 58 on the channel 56 when the rail section 48 is raised, alignment of the rail section 48 with the oppositely facing ends of the portions 42 and 44 of the rail 16 may be effected. It should be noted that allowing the internally sliding piston to contact the housing upper end stop of the actuator 58 in order to effect an upper limit does not adversely affect the housing because of the reduced momentum factor associated with upward movement. Also, lateral alignment of the rail section 48 may be insured by employing downwardly pointed centering pins 185 and 187 depending from the rail portions 42 and 44 and being received within correspondingly sized centering openings formed in the second lower portion 70 of the bracket 66.

As can be appreciated from FIG. 3, the variable height workstation 38 operates such that the trolley delivery apparatus 10 is usually involved with a series or a single diverted trolley 14 collecting upstream of the preworkstation escapement device 40. To this end, a dual action pneumatic actuator 90 associated with the escapement device 40 responds to instructions issued by the control box 86 and rotates a pivotal cam 92 to accelerate the closest one of the collecting trolleys 14 toward the delivery apparatus 10 such that the involved trolley 14 travels from the upstream rail section 42 and onto the moveable rail section 48 located in its bridging position. The preworkstation escapement device 40 may be adjustably supported by a generally angular bracket 77 bearing on an outwardly disposed flat flange 55 extending from the channel 56. The flange 55 has a slot 76 extending generally parallel with the rail portion 42 and receives at least one threaded bolt eXtending inwardly from the bracket 77, which threaded bolt cooperating with a corresponding locking nut 71 such that the preworkstation escapement device 40 may be adjusted relative to the trolley delivery apparatus 10 if desired.

Referring now to the cutaway portion of the channel 56 shown in FIG. 4, means for adjusting the position of the lower stop 64 are illustrated. The lower stop 64 is fixed within a stop cradle 100 having a generally transversely extending portion 102 and a vertically extending portion 104. A through threaded bore 101 is formed in the transversely extending portion 102 and is sized to receive the cylindrically shaped and externally threaded housing of the stop 64. The vertically extending portion 104 of the cradle 100 has in horizontal cross-section a generally U-shape defined by a backwall 108 and two juxtaposed sidewalls 110 and 112 which are bridged outwardly of the backwall 108 with one another by the transversely extending portion 102 thereby forming the cradle 100.

The actuator 58 is spaced from the inner backwall 156 of the channel 56 at anchoring locations 106 and 107 so as to fix the actuator 58 in a spatial relationship with the inner backwall 156. As such, a spacing S is created between the actuator 58 and the wall 156 such that the thickness of the rear wall 108 of the cradle 100 is capable of freely sliding between the two juxtaposed surfaces of actuator 58 and the wall 156. A vertically extending slot 116 is formed in the wall 156 of the channel 56 such that at least one threaded shank 118 extends from the cradle 100 through the slot 116 and cooperates with lock nuts 120. As such, an operator desiring to either lower or heighten the position at which the rail section 48 carrying the involved trolley becomes seated on the workstation 38, may loosen the lock nuts 120 and proceed to either raise or lower the position of the cradle 100 according to the individual needs of that particular operator.

Figure 5:
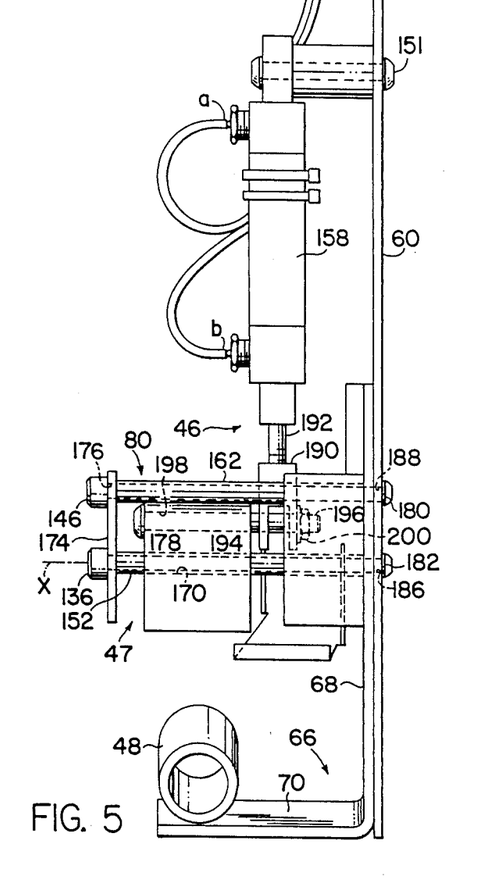
FIG. 5 is an enlarged front elevation view of the movable rail section and trolley engagement means shown separately from the variable height workstation embodying the present invention.
Figure 6:
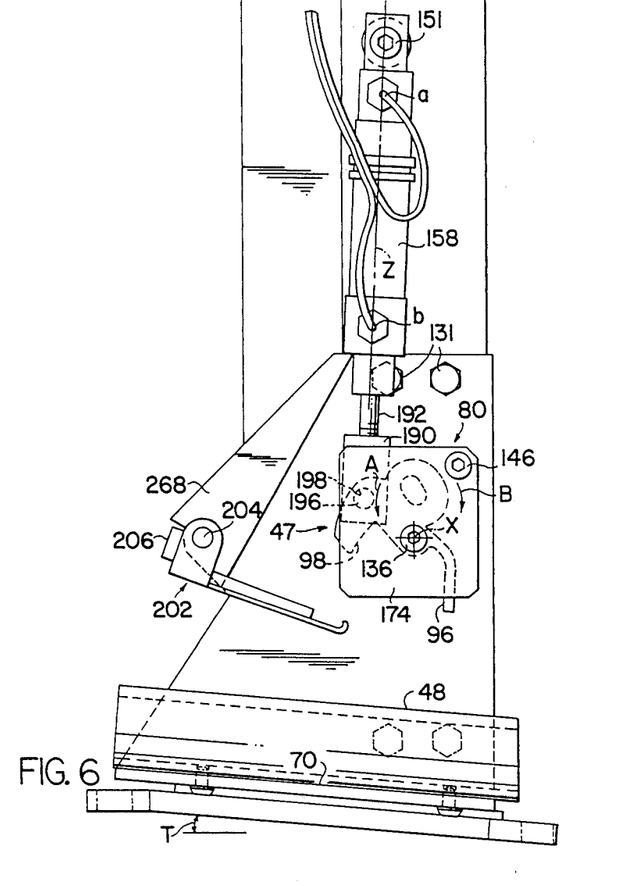
FIG. 6 is an enlarged side elevation view of the moveable rail section and the trolley engagement means shown separately from the variable height workstation embodying the present invention.

Turning next to FIGS. 5 and 6, the trolley engagement means which controllably stops and accelerates an involved trolley at a position intermediate the distal ends of the rail section 48 is shown. The pivotal cam 47 is rotated about the central axis X in either of the indicated A or B rotational directions by the dual-action actuator 158 fixed above, yet laterally offset from the cam 47. The actuator 158 is fixed at its upper end to the slide 60 by the connector 151 and is attached to the pivotal cam member 47 at its other lower end. A pivot cage 80 is disposed adjacent the actuator lower end and is fixed to the slide 60. The pivot cage 80 includes a pivot pin 136 received in a through opening 170 formed in the cam 47 and a second pin 146 supporting a support plate 174. A sleeve 152 surrounds the pivot pin 136 and is also received in the opening 170 which is sized to receive the outer surface of the sleeve 152 in a close fitting yet rotatable relationship.

The plate 174 laterally supports the pivot pin 136 and the second pin 146 such that each of the pins 136 and 146 extend generally parallel with one another and to the axis X. Another sleeve 162 receives the second pin 146 such that each of the sleeves 152 and 162 at their left outer ends abut against the support plate 174 to space the plate 174 from the slide 60. To this end, the lateral support plate 174 has through openings 176 and 178 each having a diameter sized to receive only the diameters of each of the pins 136 and 146 but not the sleeves 152 and 162. Likewise, in the bracket 66 and the slide 60 are formed through openings 186 and 188 which are sized only to receive the pins 136 and 146 such that the right o inner face of the sleeves 152 and 162 abut against the outside surface of the vertically extending portion 68 of the bracket 66 so as to space the plate 174 in a parallel relationship with the slide 60. Retaining rings 180 and 182 or, other like axial retaining means, are placed within the grooves formed at the inner ends of the pins 136 and 146 to axially retain the pins 136 and 146 against movement.

As previously discussed, the actuator 158 is capable of rotating the cam 47 in either of the indicated clockwise rotational direction B or the counterclockwise rotational direction A. For this purpose, the actuator 158 is connected to the cam 47 by torque transmitting means which includes a clevis 190 threadably secured at one end to the piston rod 192 of the actuator 158 and has at its other opposite free end, a transversely extending opening 194 Which rotatably receives a bolt 196. The bolt 196 is also received within a second through opening 198 formed in the cam 47 at a point radially offset from the central axis X. The bolt 196 may be threaded at its inner right end such that a nut 200 axially retains the bolt 196 relative to the clevis 190 and the cam 47. Since the bolt 196 connecting the piston rod 192 with the cam 47 is located offset from the central axis X, torque transmission between the actuator 158 and the cam 47 is effected in either rotational direction by the couple created when the piston rod 192 moves vertically along line of action Z relative to the stationary pivotal axis X.

As is shown in FIG. 6, it may be preferably to employ a trolley backflow latch 202 pivotally fixed to a rearwardly projecting an laterally spaced wing 268 of the bracket 66 to insure that a trolley entering onto the moveable rail 48 is restricted from inadvertently moving upstream once it travels onto the rail section 48. The latch 202 is pivotally mounted on pin 204 and is restrained from rotating downwardly past a generally four o'clock position by an abutment 206 which confronts with a part of the wing portion 268. However, it should be understood that the latch 202 is free to move upwardly beyond the indicated four o'clock position to allow a trolley to pass under it.

Figure 7:
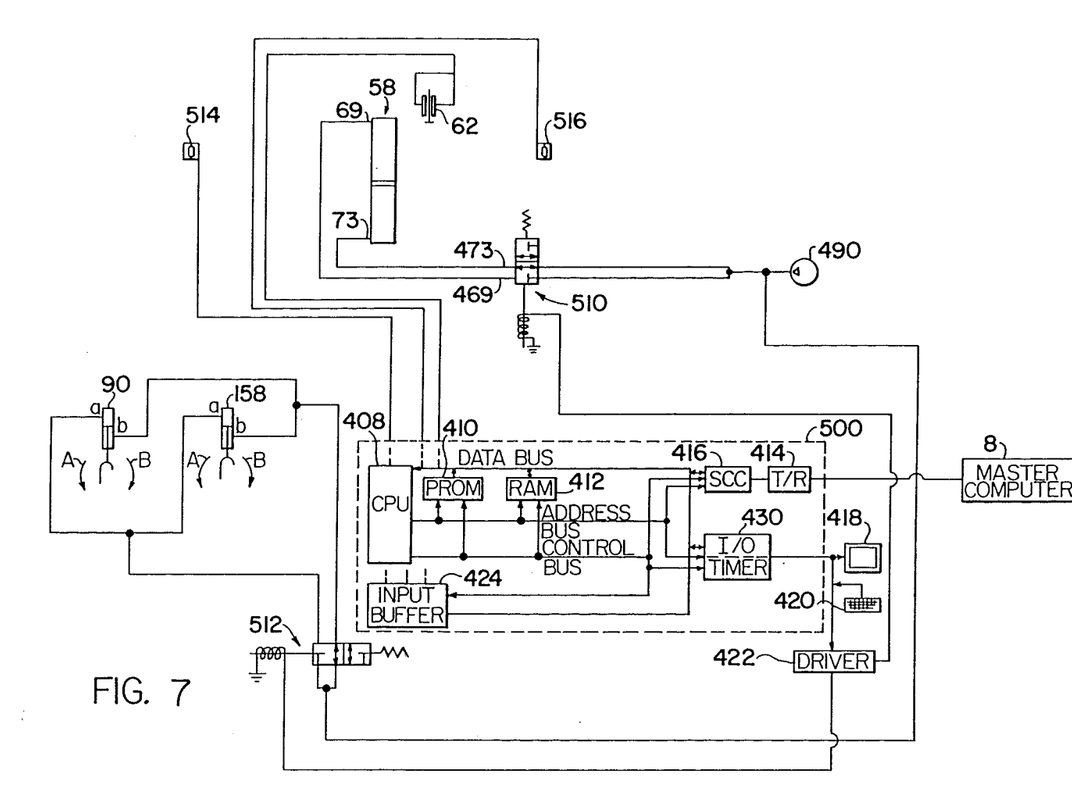
FIGS. 7 is a schematic of the control system employed in the workstation embodying the present invention.

Referring now to FIG. 7, a general schematic of the control system used for controlling the selectively positionable variable height workstation of the present invention is shown. A pressurized fluid source 490 provides the actuators 58, 90 and 158 with pressurized fluid, usually compressed air, which pressurized fluid communicates through a conduit system connecting these actuators with the source 490. The pneumatic fluid introduced into the actuator 58 is controlled by a electric solenoid valve 510 which is normally biased in the closed position as shown in FIG. 7 such that the conduit line 473 feeding the lower inlet 73 is continuously supplied with pneumatic fluid and the pneumatic line 469 supplying the upper inlet 69 is blocked when the solenoid 510 is in its deactivated state.

The actuators 90 and 158 which control the pivotal movements of the cams or indexers 92 and 47 are connected with the fluid source 490 in parallel with one another. The actuators 90 and 158 are dual chamber actuators having an upper inlet a and a lower inlet b each of which inlets respectively introducing fluid into the upper and lower chambers. The simultaneous introduction of fluid into inlets b of the actuators 90 and 158 results in each of the cams 92 and 47 being rotated counterclockwise in the indicated A direction to an open orientation thereby accelerating an associated trolley. Conversely, introducing pressurized fluid into the inlets b results in each of the pivotal cams 92 and 47 being rotated in the indicated B clockwise direction to a blocking orientation thereby arresting the travel of a associated trolley. The alternative introduction of pneumatic fluid into each of the inlets a or b is controlled by energizing and deenergizing a solenoid valve 512 normally biased to introduce pneumatic fluid into the inlets b and block fluid from inlets a of the actuators 90 and 158 when deenergized. As such, it should be appreciated that the cams 92 and 46 are normally oriented in a blocking orientation when the solenoid 512 is deactivated.

The control box 86 generally houses controller 500 which is connected with the solenoid valves 510 and 512 and to sensory inputs which take the form of an upstream sensor 514, a downstream sensor 516 and the rail section vertical movement sensor 62. The sensors 514 and 516 are preferably optical sensors which generate signals to the controller 500 indicating the presence of a trolley when such a trolley is in the general vicinity of the individual sensor. Additionally, the sensor positioned at the top end of the actuator 58 is preferably a magnetic type sensor commonly known as an ALEPH, model PS-711, which generates a signal to the controller 500 when the metal strip 61 passes across it indicating that the actuator has moved the rail section 48 to a bridging position.

The controller 500 includes an eight bit central processing unit (CPU) 408 commonly known as a MOTOROLA 6809, coupled with a programmable read only memory (PROM) 410 and a read/write memory (RAM) 412 such that the RAM memory 412 stores the source code for the algorithm to be used to operate the workstation 38 which is downloaded to it from the master computer 8. The master computer 8 communicates With the controller 500 along a serial channel connected with a transmit receive buffer 414 and a serial communication controller 416. The central processing unit 408 also communicates With a display 418 and a keyboard 420 through an input/output parallel interface 430 having a timer connected with the clock of the master computer 8 for creating intervals during the operation cycle of the workstation as will become more readily apparent. In addition to the display and keyboard peripheral devices, the CPU 408 also communicates with a solenoid driver 422 connected with each of the solenoid valves 510 and 512. An input buffer 424 is connected with the vertical movement sensor 62 and each of the upstream and downstream sensors 514 and 516 in order to provide the controller 500 with information about the travel of a trolley through the workstation and about the position of the rail section 48. Thus, it should be appreciated that the operator 43 is capable of selectively controlling the movements of the rail section 48 and each of the cams 92 and 47 by interacting with the controller 500 through the keyboard 420 so as to selectively control the movements of these elements in a sequential manner.

Figure 8:
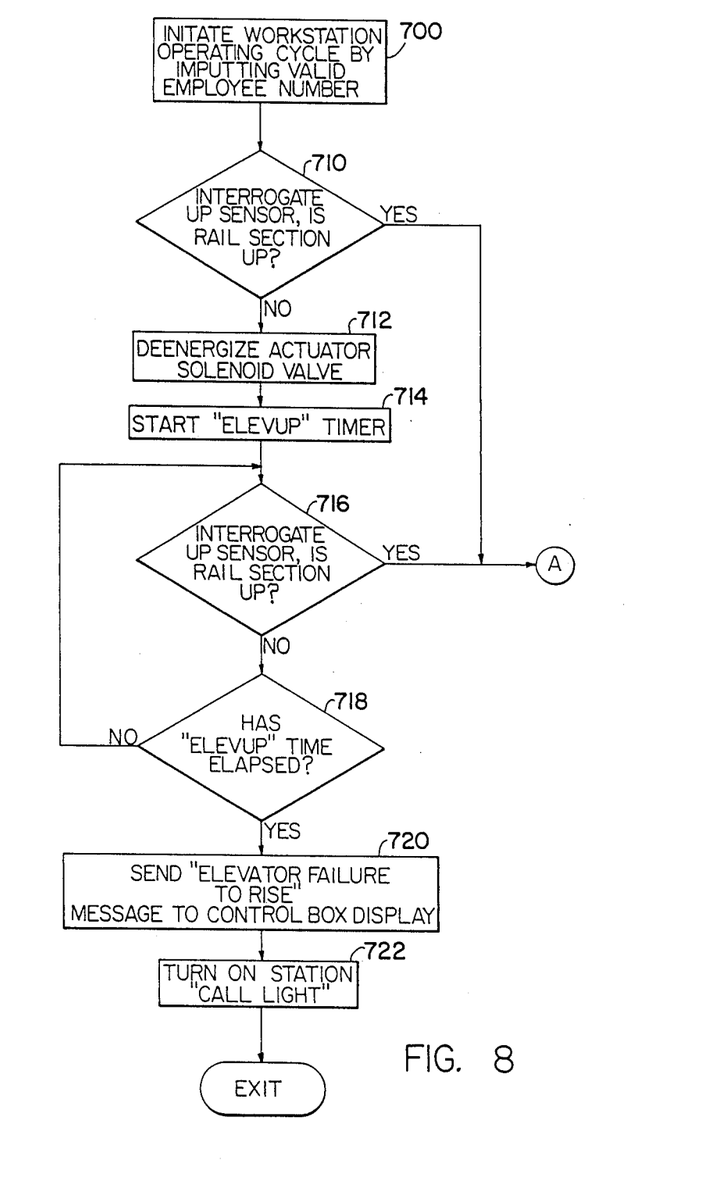
FIGS. 8, 9, and 10 shoW a floWchart illustrating a method of operating the control system of FIG. 7.
Figure 9:
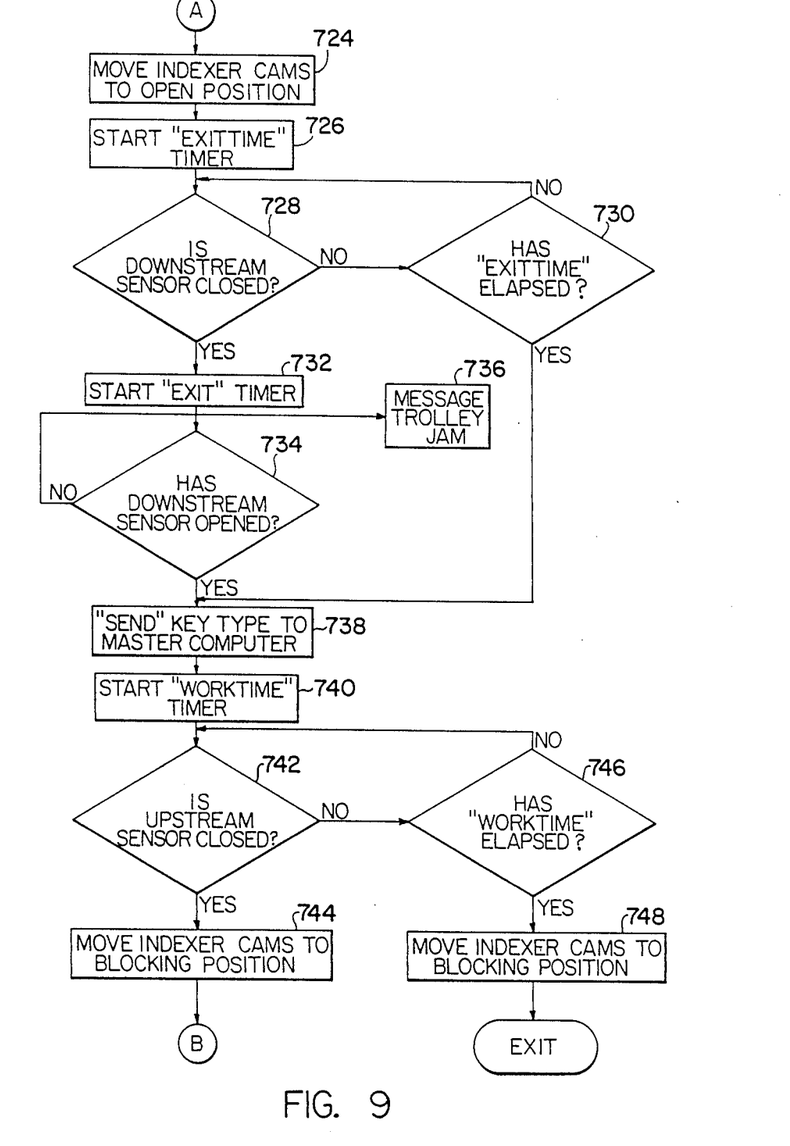
Figure 10:
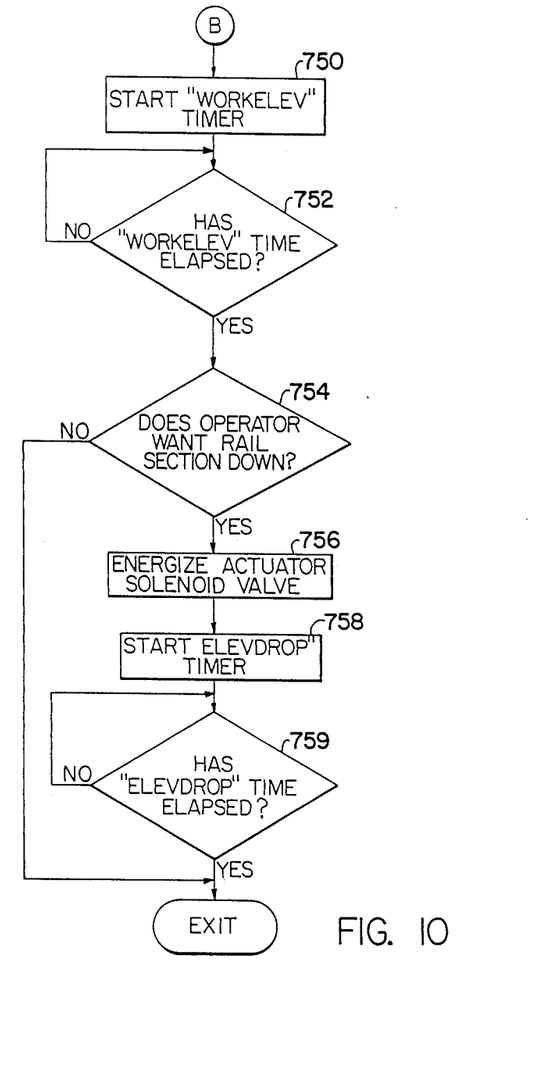

Referring now to FIGS. 8, 9, and 10, the method for operating the variable height workstation 38 is illustrated. As previously discussed, the selectively positionable variable height workstation 38 enables an operator to choose whether to lower a trolley traveling onto the rail section 48 or pass the trolley through the subsidiary loop 16 without being so diverted to the workstation. To this end, an algorithm is employed to effect such operation of the workstation 38.

In using the selectively positionable variable height workstation 38, the operator effects power-up of the workstation by imputing his or her employee number into the control box 86. If the inputted user number is valid (step 700), the CPU 408 will in turn initiate the workstation operating cycle according to the preprogrammed algorithm illustrated in steps 710 through 759.

The CPU 408 first checks to see whether the actuator 58 has moved the rail section 48 to its upper bridging position as shown in step 710. If the elevator is not in its up position, the CPU 408 in turn issues a signal to the solenoid 510 through the solenoid driver 422 setting the solenoid 510 to the "off" position as shown in FIG. 7. As previously mentioned, in the illustrated "off" position, pressurized fluid is continuously introduced into the lower inlet 73 of the actuator 58 so a to maintain the rail section 48 in its bridging position (step 712). Subsequently, the CPU starts an ELEVUP timer sequence (step 714) during which interval the CPU 408 again interrogates the sensor 62 (step 716) to determine Whether the actuator 58 has raised the rail section 48 to its bridging position. The mnemonic ELEVUP corresponds to a predetermined time interval needed for the actuator 58 to raise the rail section 48 to its bridging position. If at the end of the ELEVUP duration the actuator 58 has failed to move the rail section 48 into its bridging position, the CPU 408 issues a message to the control box display 48 indicating that an elevator failure has occurred (step 720) and, automatically, a station call light (step 722) is lit indicating that the workstation in question is experiencing problems and that assistance is needed and the CPU exits the operating cycle.

If however, at step 716 the rail section returns to its bridging position within the allocated ELEVUP period, the CPU 408 in turn generates an "energize" signal to the solenoid 512 which pressurized the upper chambers of the actuators 90 and 158 to rotate the pivotal cams 92 and 47 to their open orientations. It should be appreciated at this point that if a trolley had been stationed on the rail section 48 prior to the initial power-up step, then at the solenoid deenergized command (step 712), this trolley would in turn be moved upwardly with the rail section 48 to the bridging position on the subsidiary loop 16 and will furthermore be accelerated off the rail section 48 by the pivotal cam 47 when the instruction is given at step 724 to activate the solenoid 512 and rotate the cams 92 and 47 to their open positions.

In order to insure that a trolley stationed on the rail section 48 has been successfully accelerated off the rail section 48 and onto the downstream portion 44 of the subsidiary loop 16, the CPU 408 again starts a timer sequence (step 726), set at a predetermined duration equal to the mnemonic EXITTIME, and proceeds to interrogate the downstream optical sensor 516 (step 728) in order to establish whether or not a trolley was previously stationed on the rail section 48. If the EXITTIME duration lapses without the sensor 516 becoming closed through the passing of a trolley (step 730), the CPU 408 will proceed in the cycle without further interrogation of the downstream sensor 516.

However, if the downstream sensor 516 indicates that it has become closed due to the presence of a trolley and has not yet again opened, the CPU 408 then initiates an EXIT timer sequence (step 732) in which the downstream sensor 516 is continuously interrogated (step 734) for the duration of the EXIT period to establish whether or not the downstream sensor 56 has again become open due to the exiting trolley passing from this location. In so doing, the controller 500 ensures that if a trolley has become stopped or jammed at the exit point adjacent the downstream portion 44 of the subsidiary loop 16, a message (step 736) will be generated indicating that a trolley is jammed and will continue to do so until the jammed trolley is moved past the sensor 516.

After the trolley exiting the rail section 48 moves away from the workstation 38 and the controller 500 is satisfied that no trolley is stationed on the rail section 48 or that if such a trolley did exist that it has now successfully exited from the workstation, the operator may then generate a SEND command to the host master computer 8 indicating that the operator wishes to have that exiting trolley moved to a particular destination along the automated rail system 5 (step 738).

The CPU 408 then initiates other timer sequence in this case, having a duration equal to the mnemonic WORKTIME (step 740), in which period of time the CPU 408 continuously interrogates the upstream optical sensor 514 (step 742) to determine whether or not a new trolley has advanced onto the rail section 48. If the sensor 514 generates a closed signal due to the trolley passing by it, the CPU 408 then issues a "solenoid off" signal to the solenoid valve 512 (step 744) which in turn pressurizes the lower chambers of each of the actuators 90 and 158 thereby rotating the cams 92 and 47 in a clockwise B direction to a closed orientation. If, however during the WORKTIME timer sequence, the upstream optical sensor 514 is not activated (step 746), the CPU 408 will nevertheless generate a "solenoid off" signal to the solenoid 512 to rotate the cams 92 and 47 to their blocking positions (step 748). Thereafter, the CPU 408 will recognize that there are no new trolleys at the preworkstation indexer 40 and will exit the cycle. It should be appreciated however that in any case, that at this point in the algorithm, the cam 47 will be in a blocking position so as to arrest the travel of a trolley traveling downwardly on the rail section 48 prior to its reaching the downstream end of the rail section 48.

If at step 742 the sensor 514 indicates the presence of a trolley, the CPU 408 initiates yet another timer sequence (step 750) having a duration corresponding to the mnemonic WORKELEV and during which period the workstation 38 generally is in a state of inactivity (step 752). This period of inactivity allows the trolley to settle on the moveable rail section 48 so that any swaying movement will cease prior to its being lowered toward the workstation table 33.

After the WORKELEV interval has passed, the operator decides (step 754) to either lower the rail section 48 or to allow the trolley presently situated on the rail section 48 to pass through the workstation 38 without being lowered. In the instances where the operator desires to lower the rail section 48 and the trolley carried by it from the bridging position, the operator engages a button on the control box 86 which results in the CPU 408 issuing a "solenoid on" signal to the actuator solenoid 510 which introduces pressurized fluid to the upper inlet 69 thereby moving the rail section 48 downwardly (step 756). After issuing the "solenoid on" signal the CPU 408 initiates another timer sequence, in this case having duration equal to the value of the mnemonic ELEVDROP, during which period a period of inactivity is again created (step 758). This period ensures that the actuator 56 will be allowed to fully lower the rail section 48 without a subsequent, possibly inadvertent command interrupting this lowering process. Once the ELEVDROP duration expires, the operating cycle for the workstation is completed and the CPU 408 begins its instructions again back at the beginning of the cycle at step 710. Likewise, if at step 754 the operator indicates that the rail section 48 should not be lowered, the operating cycle will exit at this point and await further instructions from either the master computer 8 or the operator via the control box 86.

While the present invention has been described in a preferred embodiment, it should be understood that various modifications and substitutions to the structures and methods disclosed may be employed. For example, while the microprocessing unit disclosed in the preferred embodiment is one such as shown in FIG. 7, it is entirely possible to effect the same processing of the disclosed algorithm using other known conventional microprocessing operations. In addition, a pneumatic fluid source is disclosed for energizing the actuators controlling the movement of the pivotal cams. However, such actuators could alternatively be solenoid actuators utilizing electric power as an energy source. Furthermore, various other types of escapement devices or indexers may be employed to accelerate trolleys onto the delivery apparatus 10 or onto the elevator 54 and are not limited to the type described herein. Accordingly, the present invention has been described by way of illustration rather than limitation.

We claim:

1. A trolley delivery apparatus, positionable in a gap formed between adjoining rails, said apparatus comprising:
    a moveable rail section having opposite distal ends supported for movement between one position where said moveable rail section bridges a gap between opposed portions of adjoining rails and another position remote from said one position where said moveable rail section is positioned generally adjacent a workstation;
    engagement means for arresting travel of a trolley at a position on said moveable rail section between said distal ends and for controllably accelerating said trolley off said rail section when said rail section is in said one position;
    said engagement means including a cam biased in either of two directions by a first actuator means, said cam being spaced from said moveable rail section and being connected with it such that said engagement means and said moveable rail section move in unison between said one position and said another position;
    a second actuator means mounted to a support for moving said moveable rail section and said engagement means with one another between said one position and said another position; and
    control means for controllably energizing and deenergizing said first and said second actuator means so that a trolley traveling along said moveable rail section can be either diverted to said another position adjacent said workstation or allowed to pass from the moveable rail section onto one of said adjoining rails without being diverted from said one position.

2. A trolley delivery apparatus as defined in claim 1 further characterized by:
    said second actuator means includes a vertically oriented actuator capable of vertically moving said rail section and said engagement means between said one and said another position; and
    said second actuator means having stop means including a lower adjustable stop for adjustably limiting the downward movement of said moveable rail section.

3. A trolley delivery apparatus as defined in claim 2 further characterized in that said cam is a pivotal cam biased in either rotational direction by said first actuator means, and
   wherein said first actuator means being a dual-action actuator connected with said control such that said control means is capable of orienting said cam in either an open or closed orientation.

4. A trolley delivery apparatus as defined in claim 2 further characterized by said vertically oriented actuator having an elongate housing defined by opposite distal ends;
   said elongate housing enclosing a sliding piston capable of moving said engagement means and said moveable rail section vertically between said one and said another positions; and
   wherein said vertical actuator includes a slide coupled to said sliding piston for movement between said one position and said another position with said moveable rail and said engagement means being secured to said slide.

5. A trolley delivery apparatus as defined in claim 4 further characterized in that:
   said support supporting said vertically oriented actuator is an inlaid channel and has a confronting surface juxtaposed to said vertically oriented actuator;
   said vertically oriented actuator being fixed in a spatial relationship with said support confronting surface; and
   wherein said lower stop being carried by a stop cradle having a vertically extending portion interposed between said support confronting surface and said second actuator means.

6. A trolley delivery apparatus as defined in claim 5 further characterized by said vertically extending portion of said cradle having a generally U-shape defined by two vertically extending sidewalls and an upstanding rear wall; and
   said rear wall carrying adjustment means cooperating with said support confronting surface to vary position of the lower stop relative to the support.

7. A trolley delivery apparatus as defined in claim 6 further characterized by:
   said support including a vertically oriented generally elongate through slot formed in said support and cooperating with said adjustment means carried by said cradle; and
   said adjustment means further including at least one threaded shank extending from said rear wall of said cradle and communicating through said slot formed in said support and further including at least one lock nut associated with said at least one threaded shank such that the cooperation of said at least one threaded shank and said at least one lock nut draws the said cradle into engagement with the support confronting surface.

8. A trolley delivery apparatus as defined in claim 7, further characterized by said cradle including a transversely extending portion bridging said two spaced apart sidewalls of said vertically extending portion;
   said lower stop having a generally cylindrical shape and being externally threaded;
   said transversely extending portion of said cradle having a through threaded opening for threadably receiving said lower stop therein; and
   wherein said transversely disposed portion of said cradle being spaced from and extending generally parallel with said upstanding rear wall of said vertically extending portion of said cradle so as to enclose said vertically oriented actuator along a portion of its length.

9. A trolley delivery apparatus as defined in claim 3 further characterized by said pivotal cam having a stop face and a pusher portion rotatable between a flow-through orientation and a blocking orientation about a central axis such that when said pivot cam is rotated to its open orientation a trolley is accelerated away from said rail section and when said pivotal cam is rotated to its closed orientation a trolley traveling on said rail section is stopped intermediate said rail section distal ends.

10. A trolley delivery apparatus as defined in claim 4 further characterized in that said moveable rail section and said engagement means are fixed to said slide by a generally L-shaped bracket;
    said generally L-shaped bracket having a first vertical portion and a second lower portion extending generally laterally of said first vertical portion: and
    wherein said second lower portion of said L-shaped bracket carries said rail section and said first vertical portion fixes the L-shaped bracket to said slide.

11. A trolley delivery apparatus as defined in claim 9 further including a second pivotal cam located upstream of said trolley delivery apparatus adjacent one of said adjoining rails;
    said second pivotal having a stop face and a pusher portion rotated between a blocking orientation and an open orientation by a dual-action actuator.

12. A trolley delivery apparatus as defined in claim 11 further characterized by said upstream second pivotal cam being adjustable relative to said delivery apparatus along said one of said adjoining rail sections; and
    wherein each of said dual-action actuators rotating said engagement means pivotal cam and said second pivotal cam being simultaneously energized such that said engagement means pivotal cam and said second pivotal cam rotate in unison with one another between said blocking or said open orientations.

13. A trolley delivery apparatus as defined in claim 11 further characterized in that said control means includes a controller interactive with an operator for operating each of said dual-action actuators associated with each of said engagement means pivotal cam and said second pivotal cam;
    said controller further controllably activating said second actuator means to move said rail section between said one position and said another position.

14. A trolley delivery apparatus as defined in claim 13 further characterized by each of said dual-action actuators associated with each of said pivotal cams has an upper and a lower chamber such that said upper chambers of each of said dual action actuators are connected in parallel with one another and said lower chambers of each of said dual action actuators are connected in parallel with one another;
    said upper and said lower chambers of said dual-action actuators being connected to a pressurized fluid source; and
    wherein a first solenoid valve controlled by said controller and connected in line between said fluid source and each of said dual-action actuators associated with said pivotal cams controllably introducing said pressurized fluid simultaneously to both upper chambers or both lower chambers of said dual-action actuators associated With said pivotal cams.

15. A trolley delivery apparatus as defined in claim 14 further characterized by said vertically oriented actuator associated with said moveable rail section having an upper inlet and a lower inlet with a piston slideably disposed therebetween;
    said pressurized fluid source further being connected with each of said upper and said lower inlets of said vertically oriented actuator;
    a second solenoid valve controlled by said controller and connected in line between said vertically oriented actuator and said pressurized fluid source such that when said second solenoid is energized, said moveable rail section is moved downwardly and when said second solenoid is deenergized said moveable rail section moves upwardly; and
    wherein when said first solenoid is deenergized said duel action actuators associated with each of said pivotal cams positions said pivotal cams in a blocking orientation and when said first solenoid is energized said dual-action actuators rotate said pivotal cams to an open orientation.

16. A trolley delivery apparatus as defined in claim 15 further characterized by said control means includes an upstream sensor located adjacent said gap and a downstream sensor located adjacent one of said adjoining rails for detecting the presence of a trolley at such locations; and
    wherein said second actuator means further includes a sensor positioned at the top of said vertically oriented actuator and cooperating with said slide to detect the presence of said slide at its uppermost position.

17. A trolley delivery apparatus as defined in claim 9 further characterized in that said second actuator means includes a slide vertically moveable between said one position and said another position, said engagement means and said rail section being carried by said slide for movement therewith;
    said engagement means further includes a pivot cage having at least one laterally extending pin secured to said slide and defining an axis of rotation about which said pivotal cam rotates;
    said dual-action actuator of said first actuator means being positioned above said pivotal cam and being connected with said pivotal cam by torque transmitting means.

18. A trolley delivery apparatus as defined in claim 17 further characterized by said pivotal cam having a first through opening and a second through opening;
    said first through opening receiving said at least one laterally extending pin therein;
    said second through opening being oriented radially offset from said first through opening; and
    wherein said torque transmitting means includes a clevis carried by a moveable piston rod of said dual-action actuator, said clevis having a through opening for rotatably receiving a bolt passing through said second opening in said pivotal cam such that linear motion of said piston rod rotates the pivotal cam in either rotational direction.

19. A trolley delivery apparatus as defined in claim 18 further characterized in that said pivot cage includes a second pin extending laterally from said slide;
    a lateral support plate having first and second openings having diameters slightly larger in size than the diameters of said first and second pins;
    said first and second openings in said support plate receiving said first and second pins; and
    wherein each of said first and second pins being received within sleeves such that one end of each sleeve abuts said lateral support plate and said other opposite end of each sleeve abuts against said slide so as to space said support plate laterally therefrom.

20. A method of operating a variable height workstation having a rail section upon which a trolley travels and being moveable by a vertical actuator between an upper and a lower position, said workstation further including two indexers one of which being located upstream of said rail section and the other being located adjacent said rail section and wherein said method comprises the steps of:
    providing a vertical movement sensor for determining whether said rail section is in said upper position;
    providing an upstream sensor and locating it adjacent the entrance end of said rail section for determining the presence of a trolley at the upstream end of said rail;
    providing a downstream sensor and locating it adjacent the downstream end of said rail section for determining the presence of a trolley just downstream of said rail section;
    interrogating said vertical movement sensor to determine whether said rail section is in said upper position;
    moving said rail section to said upper position if said sensor does not indicate that said rail section is in its raised position;
    activating said indexers to an open orientation after said rail section is in its bridging position;
    determining whether a trolley has advanced onto said moveable rail section by interrogating said upstream sensor,
    activating said indexers after interrogating said upstream sensor to move said indexers to a blocking orientation to prevent movement of a trolley off said rail section; and
    selecting whether to lower said rail section from said upper position or to exit the involved trolley from said rail section without lowering it.

21. A method of operating a workstation as defined in claim 20 further characterized by the step of starting an EXITTIME timer after said indexers are activated to said open orientation;
    interrogating said downstream sensor during said EXITTIME interval to determine whether a trolley has exited from the moveable rail section;
    and proceeding to the step of determining whether a new trolley has advanced onto said rail section if the downstream sensor does not indicate the presence of a trolley during the EXITTIME interval.

22. A method of operating a variable height workstation as defined in claim 21 further characterized by starting an EXIT timer if said downstream sensor indicates the presence of a trolley;
    interrogating said downstream sensor for movement of the trolley away from said sensor during said EXIT interval; and
    generating a signal indicating that a trolley is jammed when said downstream sensor continues to indicate the presence of a trolley at that location after the EXIT duration lapses.

23. A method of operating a variable height workstation as defined in claim 20 wherein said step of interrogating said upstream sensor for the presence of a trolley further includes:
the step of starting a WORKTIME timer and interrogating said upstream sensor until said WORKTIME duration has elapsed;
activating said indexers to a blocking orientation if said upstream sensor indicates the presence of a trolley on the moveable rail section during the WORKTIME duration; and
exiting said operating method if said WORKTIME duration expires without said upstream sensor indicating the presence of a trolley at that location.

24. A method of operating a variable height workstation as defined in claim 23 further characterized by starting an ELEVUP timer after said indexers are activated to said blocking orientation;
allowing said WORKELEV duration to expire before proceeding with the next operation so as to create a period of inactivity thus allowing the trolley to settle on the moveable rail section.

25. A method of operating a variable height workstation as defined in claim 20 further characterized by the step of selecting whether to lower said rail section includes the step of energizing an actuator solenoid valve to lower said rail section if lowering of the rail section is selected,
starting an ELEVDROP timer; and
creating a period of inactivity corresponding to the ELEVDROP duration in order to prevent inadvertent commands from cancelling the rail segment lowering operation.

26. A method of operating a variable height workstation as defined in claim 20 further characterized in that the step of interrogating said vertical movement sensor further includes the step of starting an ELEVUP timer and interrogating said vertical movement sensor during the ELEVUP duration; and
generating a message indicating that said rail section has failed to rise if said vertical movement sensor does not indicate the presence of said rail section on its upper position.

27. A method of operating a variable height workstation as defined in claim 20 further characterized by beginning said method by inputting a valid operating number into a controller in order to identify the operator using the workstation.

28. A method of operating a variable height workstation as defined in claim 20 further characterized by the step of moving said rail section to said upper position includes the step of deenergizing a solenoid valve associated with said vertical actuator.

29. A trolley delivery apparatus, positionable in a gap formed between adjoining rails, said apparatus comprising:
a moveable rail section having opposite distal ends supported for movement between one position where said moveable rail section bridges a gap between opposed portions of adjoining rails and another position remote from said one position where said moveable rail section is positioned generally adjacent a workstation;
engagement means for arresting travel of a trolley at a position on said moveable rail section between said distal ends and for controllably accelerating said trolley off said rail section when said rail section is in said one position;
said engagement means being connected with and spaced from said moveable rail section such that said engagement means and said moveable rail section move in unison between said one and said another positions;
actuator means mounted to a support for moving said moveable rail section and said engagement means with one another between said one and said another positions;
control means for controllably energizing and deenergizing said engagement means and said actuator means so that a trolley traveling along said moveable rail section can be either diverted to said another position adjacent said workstation or allowed to pass from the moveable rail section onto one of said adjoining rails without being diverted from said one position;
said actuator means including a vertically oriented actuator capable of vertically moving said rail section and said engagement means between said one and said another position;
said actuator means having stop means including a lower adjustable stop for adjustably limiting the downward movement of said moveable rail section; and
said engagement means comprises a pivotal cam biased in either rotational direction by a dual-action actuator connected with said control means such that said control means is capable of orienting said cam in either an open or closed orientation.

* * * * *